United States Patent [19]

Schwab

[11] Patent Number: 4,567,478
[45] Date of Patent: Jan. 28, 1986

[54] LIQUID-CRYSTAL DISPLAY FOR MICROSCOPES

[75] Inventor: Klaus Schwab, Heidenheim, Fed. Rep. of Germany

[73] Assignee: Carl-Zeiss-Stiftung, Heidenheim/Brenz, Oberkichen, Fed. Rep. of Germany

[21] Appl. No.: 469,754

[22] Filed: Feb. 25, 1983

[30] Foreign Application Priority Data

Mar. 12, 1982 [DE] Fed. Rep. of Germany ....... 3208917

[51] Int. Cl.[4] ............................................ G09G 3/02
[52] U.S. Cl. .................................. 340/705; 350/502; 350/507
[58] Field of Search ............... 340/705; 350/502, 507, 350/339 F; 354/79, 289.1, 289.12, 109

[56] References Cited

U.S. PATENT DOCUMENTS

| | | | |
|---|---|---|---|
| 3,953,868 | 4/1976 | Kawamura et al. | 354/109 |
| 4,057,318 | 11/1977 | Schindl | 350/502 |
| 4,143,938 | 3/1979 | Feinbloom | 350/502 |
| 4,274,092 | 6/1981 | Vonuso et al. | 340/705 |
| 4,302,087 | 11/1981 | Reinheimer et al. | 350/502 |
| 4,365,881 | 12/1982 | Hazama et al. | 354/289.12 |
| 4,403,216 | 9/1983 | Yokoi | 350/339 F |
| 4,533,220 | 8/1985 | Kurita et al. | 350/502 |

OTHER PUBLICATIONS

Möllring, IM 35 and ICM 405, Inverted Microscopes, Zeiss Inf., (Germany), vol. 23, No. 86, (Jan. 1978).

*Primary Examiner*—Gerald L. Brigance
*Assistant Examiner*—Jeffery A. Brier
*Attorney, Agent, or Firm*—Hopgood, Calimafde, Kalil, Blaustein & Judlowe

[57] ABSTRACT

A transparent multifunction display field (LCD display 23) is reflected by means of a transmitted-light projection ray path (21–27) into the intermediate image plane (11) of a photomicroscope.

The LCD display (23) provides the viewer with information on the status of the microphotographic system by showing, superposed on the object image, corresponding symbols and numbers, illustratively for the nature and picture format of the camera used, its exposure counter, position and size of the spot used for the exposure-time measurement, the thus-determined exposure time, flashlight function, etc.

9 Claims, 4 Drawing Figures

LIQUID-CRYSTAL DISPLAY FOR MICROSCOPES

BACKGROUND OF THE INVENTION

The present invention relates to a device for superposing additional information on microscope images.

For a long time, use has been made in microscopes of so-called eyepiece reticles which, arranged in an intermediate image plane, give the viewer additional information or aids in judging the microscope image. These consist, for instance, of scales, and in the case of photomicroscopes of format limitations and focus indicators, etc. From U.S. Pat. No. 4,057,318, it is also known, for example, to project such reticles into an intermediate image plane.

Such reticles as have thus far been used for the indicated purpose are of glass, into which the required signs or symbols have been etched or have been applied by vapor deposition. The reticles are replaceably mounted to the microscope since all required signs and/or symbols cannot as a rule be presented on a single reticle, and it is disturbing to overload the reticle with different symbols. To replace or change reticles is, however, cumbersome for the user; furthermore, the replaceable attachment results in increased production cost in microscope manufacture since certain requirements are applicable as to precision of centering, light-tightness, etc. Finally, the intermediate image plane in which the reticles are arranged must be easily accessible from the outside.

In the case of photographic cameras, it is known to record additional information on film by projecting a light-emitting diode display into the film plane. In this connection, the input keyboard required for selection of requisite or desired signs or symbols is located at the rear wall of the camera; for obvious reasons, the film plane itself is not visually accessible.

Such devices can be used only to a limited extent in microphotography since the input keyboard is, as a rule, not within the range of view or work of the observer. Furthermore, although additional information may be superposed merely on the film plane, it is not possible with known devices to directly superpose data on the intermediate image which the viewer observes via the eyepiece.

From U.S. Pat. No. 4,274,092, it is known to reflect an LED display into one of the two eyepieces of a stereomicroscope. The LED display serves merely to provide information for the viewer. For example, the reflecting of data onto the film plane of a camera connected to the microscope is not possible. Furthermore, the involved asymmetrical reflection into only one of the two eyepieces is a disadvantage.

BRIEF STATEMENT OF THE INVENTION

The object of the present invention is to provice a device for superposing various additional data on microscopic images, which device operates without mechanical change, and which renders a first part of the information visible to the viewer during the microscope observation while a second part of the information is imaged in an image plane which is not directly accessible for visual observation.

The invention achieves this object by providing an electrically controllable display field and by projecting the same onto an intermediate image plane.

The advantage of using such a display field (rather than the previously customary reticles) in microscopes resides, on the one hand, in the fact that the display field can be a fixed built-in part of the microscope and it is nevertheless possible, with suitable selection of segment geometry, to rapidly and selectively switch within a large number of different symbols or digits required in the intermediate image, for different states of a microscopic examination.

When used in photomicroscopes, the possibility of switching off individual symbols intended only for the viewer but not for the film plane, as during the short time interval of a film exposure, affords particular advantages. These may, for instance, be symbols which give the user information as to the status or set condition of his microscope, for example, required exposure time, readiness for flash, magnification of the lens being used at the time, format of the camera being used at the time, etc., namely, information for which the checking of a large number of different instruments would otherwise be necessary, in accordance with the prior art. With suitable design and coupling of such instruments to the control electronics of the display field, the display field shows this information at a glance, superposed on the microscope image.

The involved display field may optionally use light-emitting diodes (LED) or fluorescent displays, or electrochromic displays operating with stray light, or devices operating with liquid crystals.

The latter display fields, known as LCD-displays, are commercially available components which are used at present for wristwatches, microcomputers, etc. They consist of a liquid-crystal layer enclosed between glass plates and polarization foils, and the transmission behavior of this layer is controlled by electric fields applied via electrodes on the glass plates. Liquid-crystal display fields are particularly well-suited for present purposes, since they can be manufactured at relatively low cost, even for relatively small quantities.

A display field of the character indicated may be projected, preferably at a reduced scale, by a transmitted-light illuminating device into the illumination-ray path of the microscope, and it is preferably so designed that the required symbols or signs appear transparent, i.e., to provide the highest possible contrast with respect to a dark surrounding field, so as to avoid halation of the image. In order to improve the contrast of about 100:1 which known LCD displays already provide, it is advantageous in addition, to provide an opaque mask for covering that part of the surface of the display field which is not required for switchable symbols.

DETAILED DESCRIPTION

The invention will be illustratively described with reference to the accompanying drawings, in which.

Figure 1:
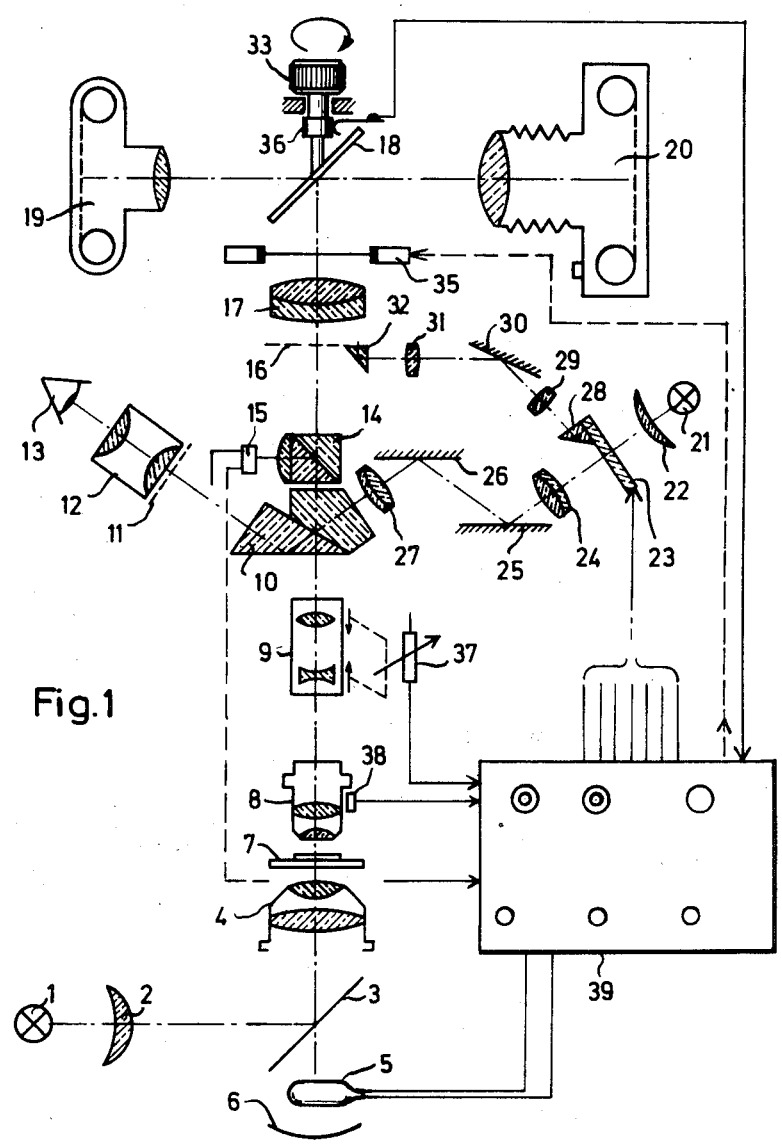
FIG. 1 is a basic diagram of the optical construction of a photomicroscope having a display field in accordance with the invention.

FIG. 1 schematically shows the ray path of a transmitted-light photomicroscope. An illuminating system comprises a light source 1, a collector 2, a partially transmitting mirror 3, and a condenser 4. A flash lamp 5 and associated reflector 6 are below the partially transmitting mirror 3.

The viewing-ray path comprises an objective 8, a zoom system 9, as well as a splitter prism 10 which reflects about 30 percent of the light, for projection of a first intermediate image 11 into eyepiece means 12. Of the remaining approximately 70 percent of the light, 10 percent is reflected in a splitter cube 14 onto a photoreceiver 15, suitably a photodiode; therefore, a second intermediate image 16 is produced by about 63 percent of the total light coming from the object. This intermediate image 16 is projected by an objective 17, depending on the selectively switched position of a rotatable mirror 18, into the film plane of either a miniature-film camera 19 or a large-film camera 20.

A display field 23 is illuminated by a light source 21 and a condenser 22 and is projected by imaging optics 24 to 27 onto the image of the object plane 7; field 23 is therefore produced in the respective intermediate image planes 11 and 16. The display field 23 is preferably a liquid-crystal display, shown in further detail in FIGS. 2 to 4. Display 23 conventionally comprises two glass plates 40, 41 having vapor-deposited electrodes on their inner surfaces, and enclosed therebetween is a liquid-crystal layer 42 in nematic phase (FIG. 3). The glass plates 40, 41 are in turn disposed between two polarization foils 43 and 44. On the light-input side, the arrangement is covered by a mask 45 which is transparent only in the region of the electrodes and is otherwise opaque.

Figure 2:
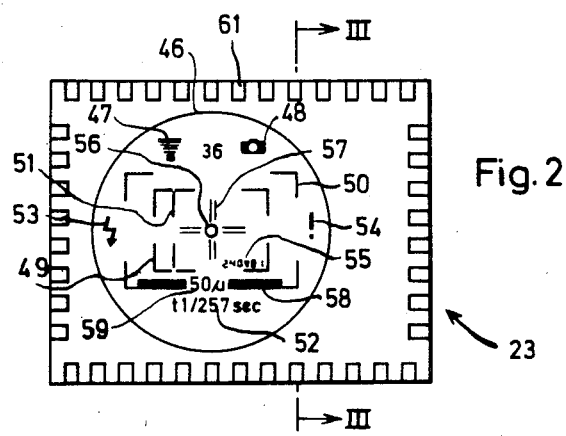
FIG. 2 is a more detailed showing of the display field of FIG. 1, seen in front elevation.
Figure 3:
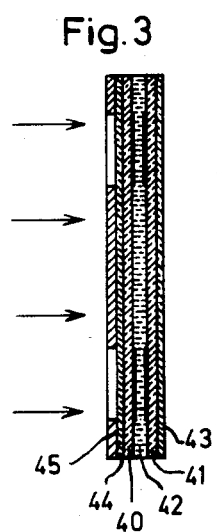
FIG. 3 is a sectional view through the display field of FIG. 2, taken along the line III—III of FIG. 2.

FIG. 2 shows the data field 23 in a negative sense, and for the sake of simplicity, symbols which appear alternatively in normal operation are also shown. A circle 46 indicates the field of view presented to the observer in the intermediate image plane 11. In its upper section, two symbols 47, 48 are provided to indicate the specific camera which is selected for operation (large picture camera/small picture camera). In between, there is a two-place digit (e.g., "36") indication for the number of pictures already exposed (exposure counter). Format frames 49/50, and a smaller frame 51 which corresponds to attachment of a Polaroid camera, are associated with the symbols 47/48. Below them is a seven-segment display 52 for the required exposure time. Readiness for flash is indicated by a symbol 53, and a symbol 54 warns of errors in operation.

Within the format frames 49-51, there is a six-place numerical-data display 55 which, as will be described further below, is not made visible in the intermediate image 11 but only in the intermediate image 16. A circle 56 indicates the spot covered by the photoreceiver 15 in FIG. 1, and the latter is used for exposure-time measurement.

In order that measurement of exposure time shall not be impaired by such light from the spot display as may reach the receiver 15 via beam splitters 10 and 14, it is advisable to cover the LCD display field 23 with a color filter in the region of spot 56. A color-barrier filter which effectively blocks out spot 56 can then be arranged in the ray path in front of the receiver 15.

Further, a cross 57 formed of very thin double lines is provided as a focusing aid. Finally, at the lower edge of the format frame 49, a scale line 58 is provided with alpha-numeric representation 59 of increment length in the object plane. And the display field is provided at its edge with contact strips, serving electrodes for the digital symbols via individual contacts 61.

As shown in FIG. 1, individual segments of the display field 23 are controlled by an electronic unit 39, which also controls actuation of a shutter 35 in the ray path to the selected one of the two cameras 19 and 20. The selection of the desired camera is effected by turning a knob 33 to rotate mirror 18; at the same time, a switch 36 is actuated, for coupled setting of the control electronics; display of applicable frame symbols 47-51 is then derived from the condition of switch 36 by means of a suitable circuit in unit 39.

The unit 39 further contains a clock for a date display 55 and an automatic-exposure system of known construction for determining, from the output signal of photodiode 15, a display 52 of exposure data. Unit 39 is further connected (a) to a distance-measurement system 37 which indicates the position of different lens elements of the zoom system 9 and (b) to a code reader 38 which supplies magnification data for the lens in current use. From these two pieces of information, the imaging scale of the optical system shown in FIG. 1 is calculated in unit 39 and then processed further to display the scale 58/59 on the display field 23.

Figure 4:
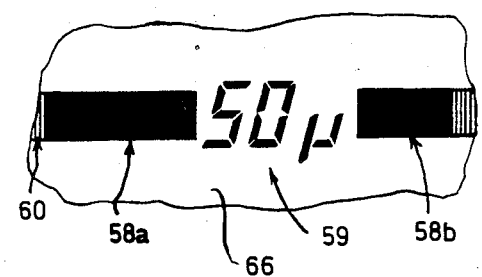
FIG. 4 is a fragmentary view on an enlarged scale, of part of the display field of FIG. 2.

In FIG. 4, the line scale 58 is seen to be formed by a plurality of individually controllable segments 60 arranged in a row one behind the other. In each case, several individual segments arranged one behind the other in a row form a beam 58 the length of which can therefore be accurately set to a segment width. The beam 58 is interrupted by an alpha-numerical display 59 which indicates the length of the beam 58 divided by the magnification of the optical system between object plane 7 and intermediate-image plane 11.

With this arrangement, a quasi-analog extension and compression of beam 58 is possible upon suitable control, so that the alpha-numerical display 59 can involve fixed wiring.

The date display indicated at 55 in FIG. 2 is not superposed on the intermediate image 11 like the other symbols and signs, but it is cut out from display 23 by means 28, being then projected by an optical system 28 to 32, exclusively and directly into the intermediate image 16 (FIG. 1). In this connection, the prism mirror 32 used for projection will be understood to locally mask the microscopic image so that the involved display of thus-projected data always appears unambiguously, i.e., unaffected by image structures in the same locale, with optimal brightness against a black background in the film plane of the applicable one of the two cameras 19 and 20, respectively. This would not be the case for deflection by beam splitters 10 and 14, which deflect into the photographic ray path only about 27 percent of the light from the display field 23.

In the disclosed embodiment, the display field 23 serves both for projection of additional symbols into the film plane and for compressed presentation of information for the user of the microscope. In certain cases, particularly when an even larger number of additional symbols and signs is to be shown, it may be advisable to use two spatially separate display fields for introduction of selectively available data and/or symbols into the photo ray path and into the eyepiece. Such an arrangement (not shown here) has the advantage that even a small amount of residual light can be kept away from the film plane, which light, despite masking of symbols intended only for the observer (for example, symbols 56 and 57), might be reflected (via splitting prism 10) into the photo ray path at the time of the exposure, as a result of the contrast difference of the LCD display field possibly not being considered sufficient; for example, when using two separately illuminated display fields, illumination of the display field used for the reflection into the eye-piece can be disconnected during exposure of the film.

What is claimed is:

1. A photomicroscope, comprising an objective, a camera, a viewing ocular, optical means including a beam splitter and determining a first intermediate-image plane in a path to said camera and a second intermediate-image plane in a separate path to said viewing ocular, a luminous display field including means for displaying thereon a plurality of indicia some of which are to be presented at the ocular-viewed field and others of which are to be presented at the photographic field of said camera, first optical-imaging means built into the microscope and imaging a first localized area of said display field at both said intermediate-image planes, and second optical means built into the microscope and imaging a second localized area of said display field at one to the exclusion of the other of said intermediate-image planes.

2. A photomicroscope, comprising an optical system providing a first intermediate-image plane for ocular viewing and a second intermediate-image plane for photographic viewing, an electrically controllable display field built into said photomicroscope, first imaging means coacting with said optical system and imaging said display field at said first intermediate-image plane, and second imaging means including a reflector directly in front of a localized area of said display field and a reflector directly in front of a localized area of said second intermediate-image plane for imaging a portion only of said display field at said second intermediate-image plane.

3. A photomicroscope, comprising an optical system providing a first intermediate-image plane for ocular viewing and a second intermediate-image plane for photographic viewing, said optical system including means for changing the image scale of the microscope, an electrically controllable display field built into said photomicroscope, imaging means coacting with said optical system and imaging said display field at said first and second intermediate-image planes, and means presenting in said display field a scale line of variable length which is indicative of the currently changed image scale of the microscope.

4. A photomicroscope, comprising an optical system providing a first intermediate-image plane for ocular viewing and a second intermediate-image plane for photographic viewing, said optical system including settable means for changing the image scale of the microscope, an electrically controllable display field built into said photomicroscope, imaging means coacting with said optical system and imaging said display field at said image planes, and means including a transducer tracking the setting of said settable means and presenting in a localized portion of said display field an indication of the currently set scale of the microscope.

5. A photomicroscope, comprising optical means including an adjustable zoom system and providing a first intermediate-image plane for ocular viewing and a second intermediate-image plane for photographic viewing, an electrically controllable display field built into said photomicroscope and imaged at said first and second intermediate-image planes, and means including a sensor of zoom-system adjustment and creating in a localized portion of said display field an indication of instantaneous zoom-system adjustment.

6. A photomicroscope according to any one of claims 2, 3, 4 and 5, in which said electrically controllable display field is a back-lighted liquid-crystal display field.

7. A photomicroscope according to any one of claims 2, 3, 4 and 5, in which said electrically controllable display field is a back-lighted liquid-crystal display field, means for creating sign and/or symbol indications within a limited area of said display field, and an opaque mask over the area of the display field not required for said indications.

8. A photomicroscope according to any one of claims 2, 3, 4 or 5, in which said means imaging the display field images the same at reduced scale in at least one of said intermediate-image planes.

9. A photomicroscope according to any one of claims 2, 3, 4 or 5, in which said display field is controlled to present current photographic-recording data, and in which said means imaging the display field images said displayed data in at least one of said intermediate-image planes.

* * * * *